Patented Oct. 26, 1937

2,097,415

UNITED STATES PATENT OFFICE 2,097,415

BENZENESULPHONHYDROXAMIDE DERIVATIVES AND PROCESS OF PRODUCING THEM

Morris S. Kharasch and Otto Reinmuth, Chicago, Ill., assignors to Eli Lilly and Company, Indianapolis, Ind., a corporation of Indiana No Drawing. Application January 23, 1937, Serial No. 121,978

6 Claims. (Cl. 260—124)

Our invention relates to the new product p-aminobenzenesulphonhydroxamide, its salts, and its new intermediate p-acetamidobenzenesulphonhydroxamide; and to the process of producing them.

Our new final product, p-aminobenzenesulphonhydroxamide, has been found efficacious, both on oral and on parenteral administration, for the treatment of streptococcic and other infections, especially those of great virulence. Effective oral dosages in adult human cases are of the order of 100–1000 mg., and effective parenteral dosages of the order of 50–500 mg.

The new p-aminobenzenesulphonhydroxamide has the following formula:

(1)

It is a pale-cream-colored, almost white, crystalline solid. It is moderately soluble in cold water, very soluble in hot water. It is rather more soluble in alcohol, ethylene glycol, and propylene glycol, either hot or cold, than in water. It is quite insoluble in ether and in benzene. It sinters at 152° C., and melts with decomposition when heated to 156°–165° C. (uncorrected). When heated in water solution for a long period of time it slowly decomposes, especially in neutral or alkaline solution. It is more stable toward heat in water solution on the acid side.

To prepare this new product, we proceed as follows:

Step 1.—To a water suspension of p-acetamidobenzenesulphonyl chloride, we add a water solution of slightly more than a molecular equivalent of a hydroxylamine salt, suitably the hydrochloride, and make the solution alkaline, as with sodium carbonate. The following equation indicates the course of the reaction.

(2) 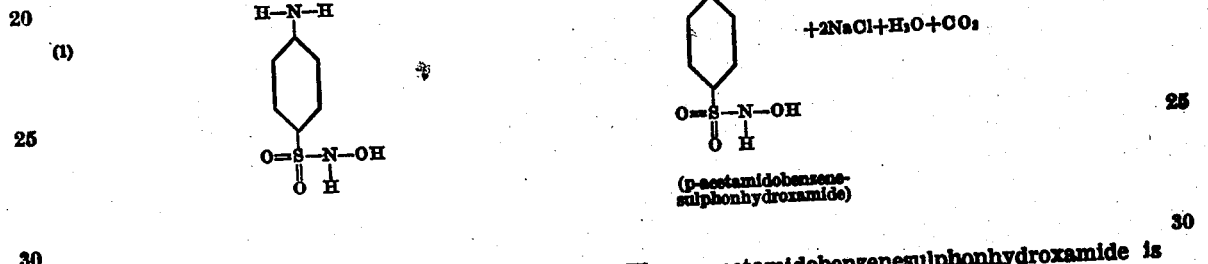

The p-acetamidobenzenesulphonhydroxamide is obtained as a solid, and may be separated in any suitable way, as by filtration. This intermediate is a new compound in itself. It melts with decomposition at 190°–191° C. (uncorrected). It is soluble in alcohol and in aqueous alcohol, difficultly soluble in water. It may be crystallized from water-alcohol mixtures (50%).

Step 2.—We now boil a suspension of this intermediate, p-acetamidobenzenesulphonhydroxamide, with a dilute non-oxidizing mineral acid, preferably 6N hydrochloric acid, until it is completely dissolved and desirably for a considerable period longer, as for about 30 to 45 minutes, to ensure complete hydrolysis. The reaction mixture is cooled, and the acid is neutralized in suitable manner, as with sodium carbonate or bicarbonate. A solid separates, and is suitably collected, as on a filter. This solid is the desired new final product, p-aminobenzenesulphonylhydroxamide. The following equation indicates the course of the reaction.

(3)
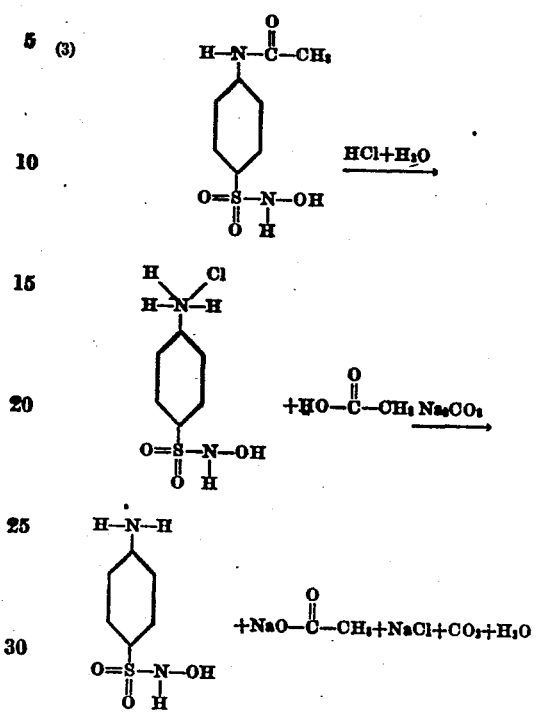

This final product, p-aminobenzenesulphonhydroxamide, may be suitably purified, as by crystallization from water.

An example of our process is as follows:

Step 1.—Thirty (30) gms. of p-acetamidobenzenesulphonyl chloride is suspended in 100 cc. of water, and a solution of 45 gms. of hydroxylamine hydrochloride in 100 cc. of water is added to it. To this we slowly add 28 gms. of sodium carbonate, and mix thoroughly. We allow the whole to stand awhile, say from one-half hour to three hours, within which time the reaction is complete. The reaction product, p-acetamidobenzenesulphonhydroxamide, is collected on a filter, and washed well with cold water, until the washings give no alkaline reaction with litmus. We crystallize this intermediate product from 50% alcohol, from which solvent it separates, on cooling, as white, glittering, needle-like crystals, melting with decomposition at 190°–191° C. (uncorrected). The yield is almost quantitative.

Step 2.—Five (5) gms. of this intermediate, p-acetamidobenzenesulphonhydroxamide, is suspended in 30 cc. of 6N hydrochloric acid. The whole is boiled, under a reflux condenser, until a clear solution is obtained; and the boiling is continued for from 30 to 45 minutes longer. The solution is cooled, and neutralized with sodium carbonate. A solid separates, and is collected on a filter and crystallized from water. The yield is good. This solid is the desired final product, p-aminobenzenesulphonhydroxamide.

This final product is effective, on either oral or parenteral administration, to combat streptococcic and other infections. It may be administered orally in tablet form, or in suspension or solution in any non-toxic menstruum. It may be administered subcutaneously, intramuscularly, or intravenously in any suitable non-toxic solvent; for which we find the glycols, especially propylene glycol, mixed with water if desired, very advantageous. It may also be administered, either orally or subcutaneously or intramuscularly, in the form of the salt of a non-toxic acid having a strength not less than that corresponding to an ionization constant of $10^{-4}$—such as the hydrochloride, sulfate, lactate, tartrate, maleate, fumarate, succinate, etc.—which salts may be formed by treating the p-aminobenzenesulphonhydroxamide with the proper acid; the salt being dissolved in a suitable solvent, most conveniently water, for subcutaneous or intramuscular administration. The general formula for these salts is:

(4)
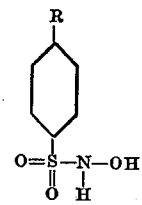

with X representing the negative ion of such an acid as just defined.

We claim as our invention:

1. The new product which is represented by the following formula:

in which R represents a radical of the class consisting of the —$NH_2$ (amino) group, the

—NH·CO·$CH_3$ (acetamido) group, and —$NH_3$·X group with X representing the negative ion of a non-toxic acid having a strength not less than that corresponding to an ionization constant of $10^{-4}$.

2. The new product p-aminobenzenesulphonhydroxamide, which is represented by the following formula:

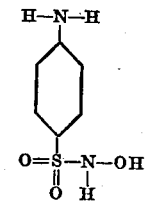

3. The new product p-acetamidobenzenesulphonhydroxamide, which is represented by the following formula:

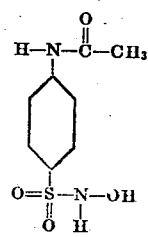

4. The process of making p-aminobenzenesulphonhydroxamide, which consists in treating p- acetamidobenzenesulphonyl chloride with a hydroxylamine salt and making alkaline, to yield p-acetamidobenzenesulphonhydroxamide as an intermediate, and boiling that intermediate with a dilute non-oxidizing mineral acid and neutralizing, to yield the desired p-aminobenzenesulphonhydroxamide.

5. The process of making p-aminobenzenesulphonhydroxamide, which consists in boiling p-acetamidobenzenesulphonhydroxamide with a dilute non-oxidizing mineral acid, and neutralizing.

6. The process of making p-acetamidobenzenesulphonhydroxamide, which consists in treating p-acetamidobenzenesulphonyl chloride with a hydroxylamine salt, and making alkaline.

MORRIS S. KHARASCH.
OTTO REINMUTH.